(12) United States Patent
Benisty et al.

(10) Patent No.: US 10,261,695 B2
(45) Date of Patent: *Apr. 16, 2019

(54) METHODS, SYSTEMS AND COMPUTER READABLE MEDIA FOR INTELLIGENT FETCHING OF DATA STORAGE DEVICE COMMANDS FROM SUBMISSION QUEUES

(71) Applicant: SanDisk Technologies LLC, Plano, TX (US)

(72) Inventors: Shay Benisty, Beer Sheva (IL); Noga Harari Shechter, Lehavim (IL); Amir Segev, Meitar (IL); Tal Sharifie, Lehavim (IL)

(73) Assignee: SanDisk Technologies LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,805

(22) Filed: Jan. 29, 2018

(65) Prior Publication Data
US 2018/0150221 A1    May 31, 2018

Related U.S. Application Data

(63) Continuation of application No. 14/868,373, filed on Sep. 28, 2015, now Pat. No. 9,927,983.

(51) Int. Cl.
*G06F 3/06* (2006.01)
(52) U.S. Cl.
CPC ............ *G06F 3/061* (2013.01); *G06F 3/0653* (2013.01); *G06F 3/0659* (2013.01); *G06F 3/0679* (2013.01); *G06F 3/0688* (2013.01)

(58) Field of Classification Search
CPC .. G06F 12/00; G06F 12/0238; G06F 12/0246; G06F 12/0253; G06F 3/0679
USPC ......................................... 711/100, 103, 154
See application file for complete search history.

(56) References Cited

U.S. PATENT DOCUMENTS

| | | | |
|---|---|---|---|
| 5,948,081 A * | 9/1999 | Foster ................. | G06F 13/1642 710/25 |
| 2002/0062414 A1 | 5/2002 | Hofmann et al. | |
| 2013/0086311 A1 * | 4/2013 | Huang ................ | G06F 13/1689 711/103 |

(Continued)

OTHER PUBLICATIONS

"NVM Express," Specification Revision 1.2, http://nvmexpress.org/wp-content/uploads/NVM_Express_1_2_Gold_20141209.pdf, pp. 1-205 (Nov. 3, 2014).

*Primary Examiner* — Tuan V Thai
(74) *Attorney, Agent, or Firm* — Loza & Loza, LLP; Gabriel Fitch

(57) ABSTRACT

Methods, systems, and computer readable media for intelligent fetching of storage device commands from submission queues are disclosed. On method is implemented in a data storage device including a controller and a memory. The method includes collecting submission queue command statistics; monitoring resource state of the data storage device. The method further includes using the submission queue command statistics and the resource state to select a submission queue from which a next data storage device command should be fetched. The method further includes fetching the command from the selected submission queue. The method further includes providing the command to command processing logic.

29 Claims, 8 Drawing Sheets

(56) References Cited

U.S. PATENT DOCUMENTS

2014/0129749 A1* 5/2014 Bass .................. G06F 13/1663
710/111

* cited by examiner

| SQ NUMBER | # PENDING COMMANDS | # FETCHED COMMANDS | # FETCHED READ COMMANDS | READ: WRITE RATIO | AVERAGE SIZE | SMALLEST SIZE | BIGGEST SIZE |
|---|---|---|---|---|---|---|---|
| 0 | | | | | | | |
| 1 | | | | | | | |
| N | | | | | | | |

FIG. 5

| BIT | DESCRIPTION |
|---|---|
| 31:16 | COMMAND IDENTIFIER (CID): THIS FIELD SPECIFIES A UNIQUE IDENTIFIER FOR THE COMMAND WHEN COMBINED WITH A SUBMISSION QUEUE IDENTIFIER |
| 15:14 | PRP OR SGL DATA TRANSFER (PSDT): THIS FIELD SPECIFIES WHETHER PRPs OR SGLs ARE USED FOR ANY DATA TRANSFER ASSOCIATED WITH THE COMMAND. PRPs SHALL BE USED FOR ALL ADMIN COMMANDS. THE DEFINITION IS DESCRIBED IN THE TABLE BELOW.<br><br>| VALUE | DEFINITION |<br>\|---\|---\|<br>\| 00b \| PRPs ARE USED FOR THIS TRANSFER \|<br>\| 01b \| SGLs ARE USED FOR THIS TRANSFER \|<br>\| 10b \| SGLs ARE USED FOR THIS TRANSFER \|<br>\| 11b \| RESERVED \|<br><br>IF THERE IS METADATA THAT IS NOT INTERLEAVED WITH THE LOGICAL BLOCK DATA, AS SPECIFIED IN THE FORMAT NVM COMMAND, THEN THE METADATA POINTER (MPTR) FIELD IS USED TO POINT TO THE METADATA. THE DEFINITION OF THE METADATA POINTER FIELD IS DEPENDENT ON THE SETTING IN THIS FIELD. |
| 13:10 | RESERVED |
| 09:08 | FUSED OPERATION (FUSE): IN A FUSED OPERATION, A COMPLEX COMMAND IS CREATED BY "FUSING" TOGETHER TWO SIMPLER COMMANDS. REFER TO SECTION 6.1. THIS FIELD SPECIFIES WHETHER THIS COMMAND IS PART OF A FUSED OPERATION AND IF SO, WHICH COMMAND IT IS IN THE SEQUENCE.<br><br>| VALUE | DEFINITION |<br>\|---\|---\|<br>\| 00b \| PRPs ARE USED FOR THIS TRANSFER \|<br>\| 01b \| SGLs ARE USED FOR THIS TRANSFER \|<br>\| 10b \| SGLs ARE USED FOR THIS TRANSFER \|<br>\| 11b \| RESERVED \| |
| 07:00 | OPCODE (OPC): THIS FIELD SPECIFIES THE OPCODE OF THE COMMAND TO BE EXECUTED. |

FIG. 6

METHODS, SYSTEMS AND COMPUTER READABLE MEDIA FOR INTELLIGENT FETCHING OF DATA STORAGE DEVICE COMMANDS FROM SUBMISSION QUEUES

CROSS-REFERENCE TO RELATED APPLICATION(S)

This application is a continuation of U.S. patent application Ser. No. 14/868,373, filed on Sep. 28, 2015, entitled, "METHODS, SYSTEMS AND COMPUTER READABLE MEDIA FOR INTELLIGENT FETCHING OF DATA STORAGE DEVICE COMMANDS FROM SUBMISSION QUEUES", the entire content of which is incorporated herein by reference.

TECHNICAL FIELD

The subject matter described herein relates to storage devices, such as nonvolatile memory devices. More particularly, the subject matter described herein relates to intelligent fetching of data storage device commands from host-side submission queues by a nonvolatile storage device.

BACKGROUND

In the nonvolatile memory express (NVMe) system, a host device writes data storage device commands, such as read commands, write commands, and administrative commands, in submission queues, which are implemented in host memory. The nonvolatile storage device fetches the commands from the submission queues, executes the commands, and places entries in completion queues, which are also implemented in host memory, to notify the host of completion of the commands. There are typically multiple submission queues allocated by the host. Accordingly, the device controller must select from which submission queue to select the next command to be processed.

The NVMe standard, the current version of which is NVM Express, Revision 1.2, Nov. 3, 2014, the disclosure of which is incorporated herein by reference in its entirety, describes two mechanisms by which a device controller may select commands from submission queues. One mechanism is a round robin mechanism, in which the device controller selects commands from the submission queues in round robin order. Another mechanism is a weighted round robin mechanism where the submission queues are assigned static priorities or weights, and commands are selected from submission queues in round robin order using weights to determine the selection order in each round.

In either case, the next command to be fetched from a submission queue is based on static arbitration logic that either implements no priorities, as in the round robin case, or that implements only static, host-defined priorities, as in the weighted round robin case. Such static arbitration logic may be sufficient if the storage device has sufficient resources to handle all host I/O requests. However, because storage device resources may be limited and host demands on those resources may exceed the device's ability to promptly process host commands, it may be desirable to select commands to improve utilization of storage device resources.

Accordingly, there exists a need for methods, systems, and computer readable media for intelligent fetching of storage device commands from submission queues.

SUMMARY

Methods, systems, and computer readable media for intelligent fetching of storage device commands from submission queues are disclosed. On method is implemented in a data storage device including a controller and a memory. The method includes collecting submission queue command statistics; monitoring resource state of the data storage device. The method further includes using the submission queue command statistics and the resource state to select a submission queue from which a next data storage device command should be fetched. The method further includes fetching the command from the selected submission queue. The method further includes providing the command to command processing logic.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which:

FIG. 5 is a table illustrating exemplary statistics that may be collected and used for intelligent submission queue command fetching according to an embodiment of the subject matter described herein;

FIG. 6 is a diagram illustrating an exemplary structure for an NVMe command.

DETAILED DESCRIPTION

Figure 1:
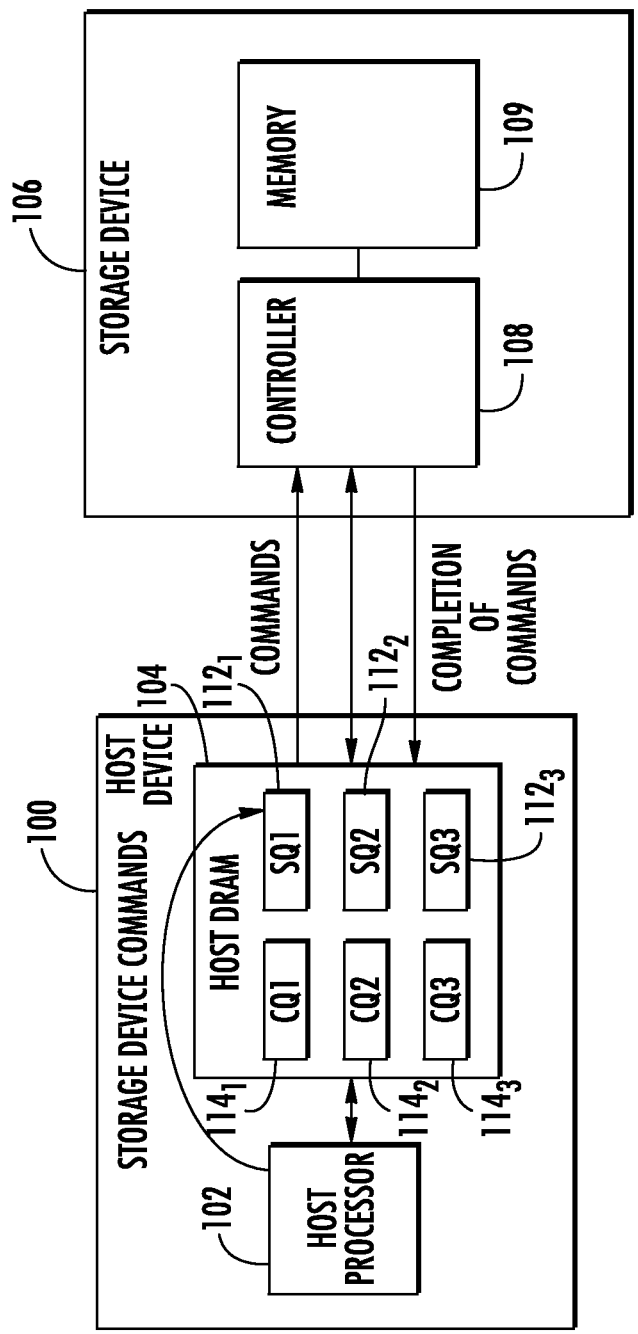
FIG. 1 is a block diagram illustrating a host device and a nonvolatile storage device according to the NVMe architecture.

As stated above, according to the NVMe standard, a host device communicates memory device commands, such as read commands, write commands, and admin commands, to a nonvolatile storage device using submission queues. FIG. 1 illustrates the NVMe architecture in which the subject matter described herein for intelligent submission queue command fetching may be implemented. In FIG. 1, host device 100 may be any suitable computing platform that is capable of accessing memory on a storage device. For example, host device 100 may be a desktop personal computer, a laptop computer, a tablet computer, a mobile telephone, or a front end to a storage array. Host device 100 includes a processor 102 and memory 104, which in the illustrated example is DRAM. Host device 100 may store data in nonvolatile storage device 106. Nonvolatile storage device 106 may be any suitable device that provides nonvolatile memory storage for host device 100. Nonvolatile storage device 106 may be a removable storage device, such as a solid state drive (SSD) that is removably connectable to host device 100. In an alternate example, nonvolatile storage device 106 may be non-removable or integrated within host device 100.

Nonvolatile storage device 106 includes a device controller 108 and nonvolatile memory 110. Device controller 108 controls access to nonvolatile memory 110. In one embodiment, device controller 108 may be a nonvolatile memory controller that implements or supports the NVMe protocol, and nonvolatile memory 110 may be 2D or 3D NAND flash memory.

In order for host device 100 to read data from or write data to nonvolatile storage device 106, host processor 102 creates and writes commands in submission queues $112_1$, $112_2$, and $112_3$. Three submission queues are shown for illustrative purposes. It is understood that there may be more or fewer than three submission queues at any given time depending on NVMe device usage by the host system. Device controller 108 fetches the commands from submission queues $112_1$, $112_2$, and $112_3$ and executes the commands. Upon completion of the commands, device controller 108 writes completion entries to completion queues $114_1$, $114_2$, and $114_3$.

Figure 2:
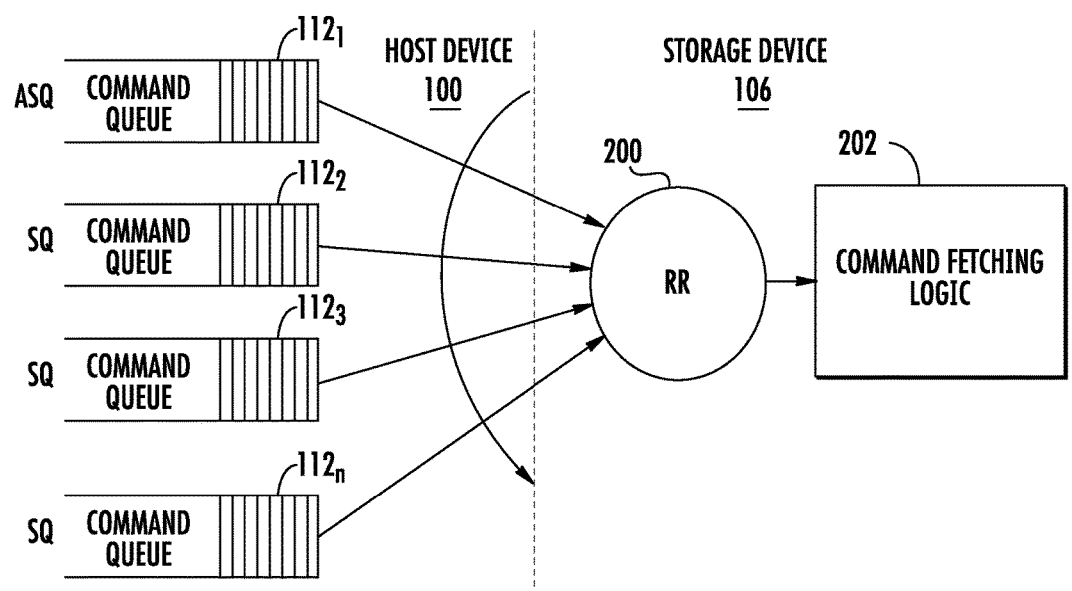
FIG. 2 is a block diagram illustrating round robin command fetching according to the NVMe standard.

As set forth above, one mechanism by which device controller 108 may select or fetch commands from submission queues from $112_1$, $112_2$, and $112_3$ is round robin selection. This mechanism is illustrated in FIG. 2. In FIG. 2, a round robin arbiter 200 statically selects a command from one of submission queues $112_1$ through $112_n$ based on a round robin selection algorithm regardless of device state, the status of the corresponding completion queues, or any other information. Round robin selection involves selecting from each queues $112_1$ through $112_n$ in order from 1 to n and continually repeating the selection in the same order. Round robin arbiter 200 instructs command fetching logic 202 to select each command. Command fetching logic 202 provides the command to command processing logic (not shown in FIG. 2), which processes the command. While round robin selection can ensure equal serving of submission queues, storage device resources may not be optimally utilized, especially when commands from the submission queues are fetched but cannot be processed due to storage device resource constraints. For example, if a write command is fetched from a submission queue and the nonvolatile storage device is unable to process the write command, then the storage device may wait until resources are available to process the write command. If the storage device processing resources for processing a read command were available but not used during the wait period, then such resources are not being efficiently utilized.

Figure 3:
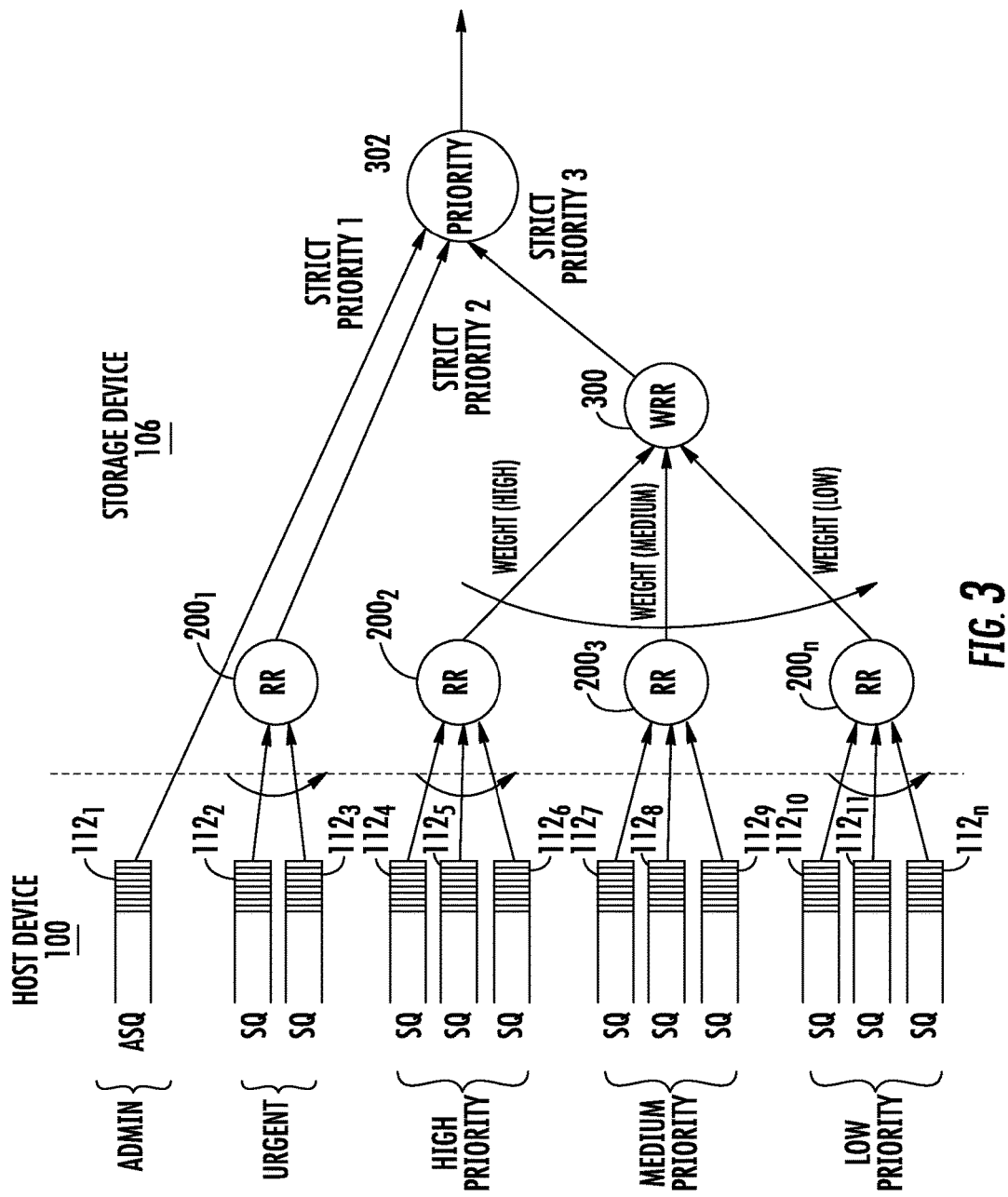
FIG. 3 is a block diagram illustrating weighted round robin command scheduling according to the NVMe standard.

Another mechanism for statically selecting commands from submission queues is illustrated in FIG. 3. In FIG. 3, weighted round robin selection is illustrated. Submission queues $112_1$ through $112_n$ are grouped according to priorities. Round-robin arbiters $200_1$ through $200_m$ each implement round robin selection for their respective queues and pass the selected queue to the next level in the hierarchy. A weighted round robin arbiter 300 selects commands from the candidates selected by round robin arbiters $200_2$, $200_3$, and $200_m$ at the previous level using assigned weights to order the candidates in each round of round robin selection. Weighted round robin arbiter 300 passes its selected queue as a selection candidate to the next level in the hierarchy, which is the highest level. A priority arbiter 302 at the highest level in the hierarchy selects from the output of arbiter 300, admin queue 112, and the output of arbiter 200, using host assigned priorities. While the mechanism illustrated in FIG. 3 allows for prioritization of commands, the priorities are statically set by the host and do not consider submission queue command statistics or nonvolatile storage device resource state. As a result, commands that cannot be immediately processed may be fetched while other commands that could be immediately processed remain enqueued in the submission queues.

Figure 4:
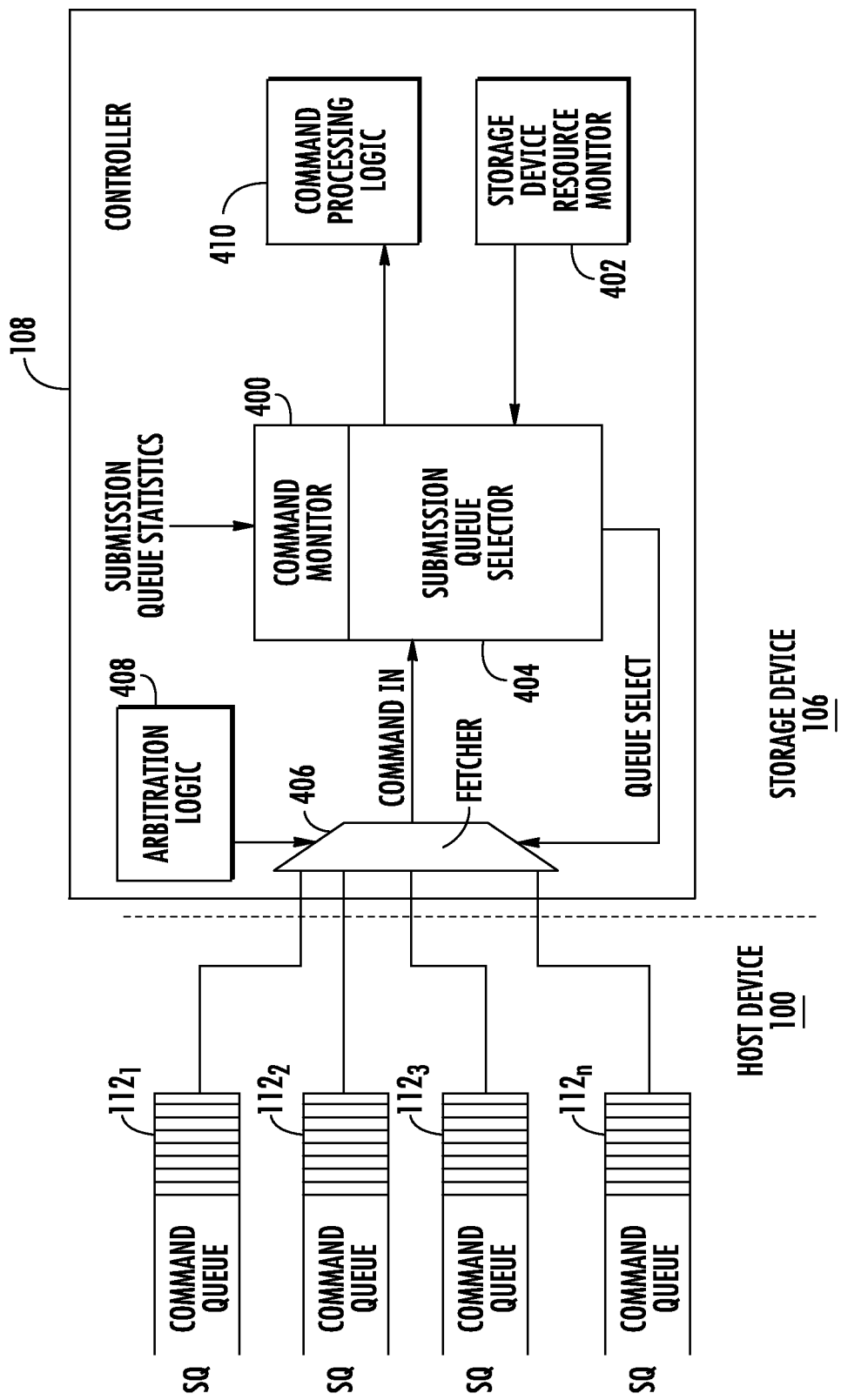
FIG. 4 is a block diagram illustrating a system for intelligent submission queue command fetching according to an embodiment of the subject matter described herein.

FIG. 4 is a block diagram illustrating intelligent fetching of commands from submission queues according to an embodiment of the subject matter described herein. In FIG. 4, device controller 108 includes a command monitor 400 that collects submission queue statistics and a storage device resource monitor 402 that monitors storage device resource state. Examples of submission queue statistics that may be collected are illustrated in FIG. 5. In FIG. 5, the submission queue statistics include, for each submission queue, the number of pending commands, the number of commands fetched from the queue, the number of read commands fetched from the queue, the ratio of read commands to write commands fetched from the queue, the average command size, the smallest command size, and the largest command size.

Statistics such as those illustrated in FIG. 5 may be used to determine the type of commands that are likely to come from a particular submission queue, given statistics on commands that have historically been fetched from the submission queue. For example, it may be determined that a particular submission queue historically contains read commands 90% of the time or write commands 90% of the time and thus the submission queue is likely to contain read or write commands in the future. In another example, the statistics may be used to determine that a particular queue historically contains a majority of random I/O commands or a majority of sequential I/O commands and thus is likely to contain a majority of random or sequential I/O commands in the future. In yet another example, the statistics may indicate commands of a particular size are historically present in a given queue, where the size of the commands refers to the amount of data written or read by a particular command. This command size information may be used by device controller 108 to predict that the next command from a particular submission queue is likely to be of a certain size or within a certain size range.

Information about the commands can be learned by device controller 108 as commands are fetched from the submission queues by reading the values of predetermined fields in the command structure. FIG. 6 illustrates an exemplary structure for an NVMe command. In FIG. 6, the opcode field specifies the type of command to be executed, i.e., read, write or admin. In the NVMe standard, a read command has opcode h1 and a write command has opcode h2. Other information that may be useful to device controller 108 in intelligent command fetching includes the size of the command, which is specified by the number of logical blocks (NLB) field in the opcode of the command. Thus, device controller 108 may read the NLB value in commands that it fetches to determine command size.

Information such as that illustrated in FIG. 5 can be used in combination with storage device resource state information to intelligently fetch commands. Returning to FIG. 4, submission queue selector 404 receives input from command monitor 400 regarding submission queue statistics and input from storage device resource monitor 402 regarding storage device resource state. Examples of storage device resource state information include the status of a read or write pipeline in the storage device, i.e., whether the pipeline is currently available to receive additional read or writhe commands. The terms "read pipeline" and "write pipeline" refer to components of nonvolatile storage device 106 respectively associated with reading data from and writing data to nonvolatile memory 110. Such components may include queues and circuitry internal to device controller 108, external to device controller 108, internal to nonvolatile memory 110, and/or external to nonvolatile memory 110. Submission queue selector 404 may utilize the submission queue statistics and the storage device resource state to identify one of submission queues $112_1$-$112_n$ from which the next command to be processed is selected and provide input to fetcher 406 that identifies the selected queue. Fetcher 406 receives the selection input from submission queue selector 404 and may also receive input from arbitration logic 408. Arbitration logic 408 may implement round robin, weighted round robin, or other selection algorithm as described above. In one example, the intelligent selection from submission queue selector 404 may override round robin or weighted round robin selection provided by arbitration logic 408. In another example, the selection input from command submission queue selector 404 may mask a particular queue from the current round of round robin or weighted round robin selection so that the queue is not included or passed over in the current round of round robin or weighted round robin selection.

One specific example of intelligent command fetching may be that the command monitor 400 determines that submission queue $112_1$ has historically contained mostly read commands and submission queue $112_2$ has historically contained mostly write commands. Storage device resource monitor 402 may determine that the storage device is currently incapable of processing write commands because the internal write pipeline is full, but the read pipeline is capable of processing read commands. In such a case, submission queue selector 404 will select submission queue $112_1$ as the submission queue from which the next command will be selected, which, based on the statistics is likely to be a read command. A similar selection may be performed from submission queue $112_2$ if it is determined that the read pipeline is full but that the write pipeline is available.

In another example, it may be desirable to select a number of random writes to fill a page of storage device memory with random writes. In such an example, command monitor 400 may determine that one of submission queues $112_1$ through $112_n$ has historically contained mostly random writes of small size, such as 4 kilobytes. Submission queue selector 404 may then fetch enough random writes from the identified queue to fill a page and may select a number of random writes from that queue to fill the page.

Figure 7A:
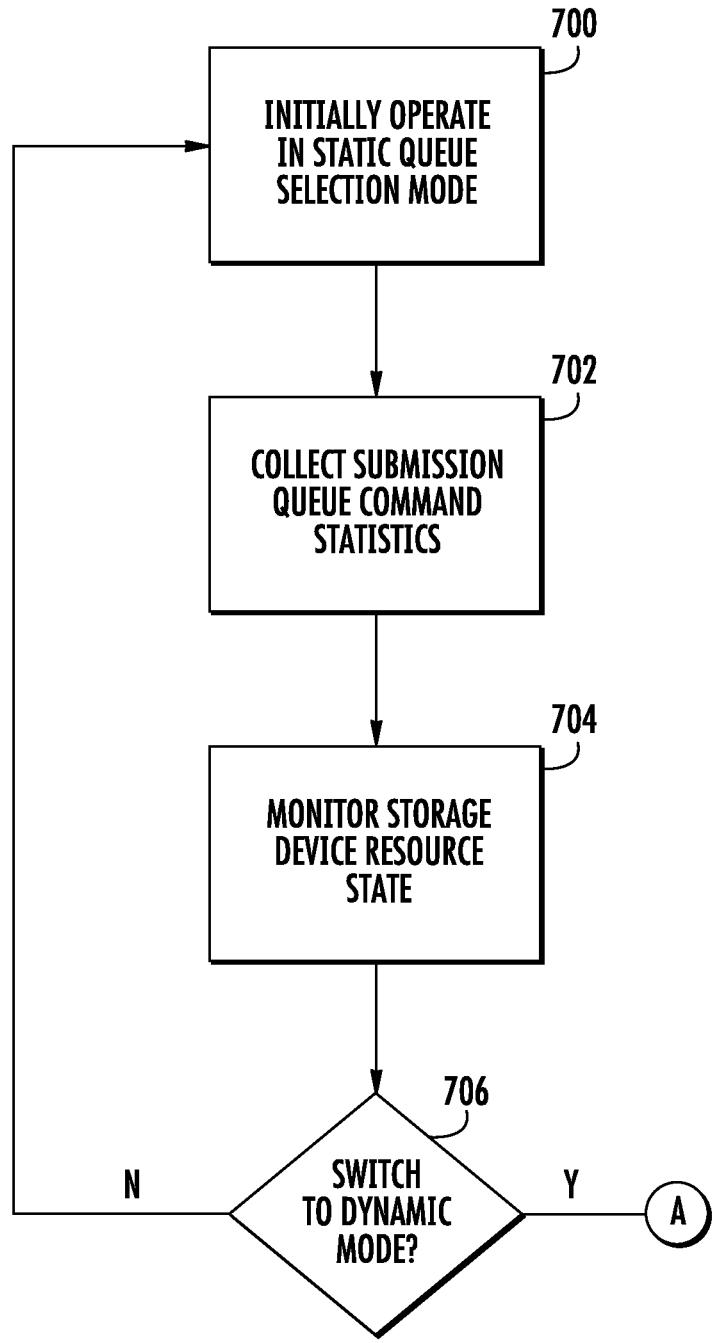
FIGS. 7A and 7B are flow charts illustrating a process for intelligent submission queue command fetching according to an embodiment of the subject matter described herein.
Figure 7B:
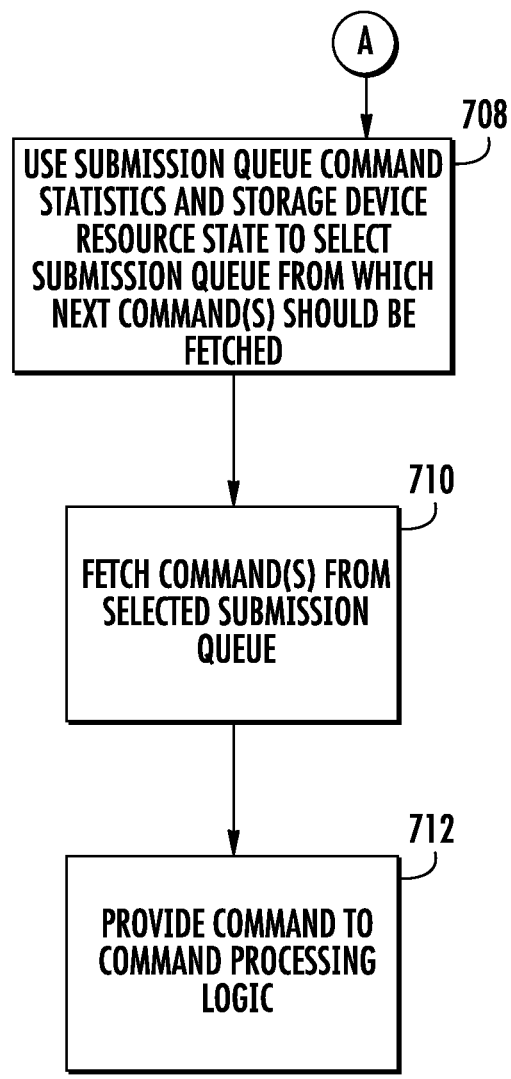

FIGS. 7A and 7B illustrate intelligent submission queue command fetching according to an embodiment of the subject matter described herein. Referring to FIG. 7A, in step 700, the storage device may initially operate in a static submission queue selection mode. Static submission queue selection mode may be round robin, weighted round robin or any other mode specified by the NVMe or other protocol where commands are fetched from submission queues in a static order. In steps 702 and 704, the device collects submission queue command statistics and monitors storage device resource state. Steps 702 and 704 may be performed continually, whether static command fetching, dynamic command fetching, or a combination of static and dynamic command fetching is being implemented. In step 706, it is determined whether to switch to dynamic mode. Switching to dynamic mode may be implemented, for example, when storage device resource state information indicates that one or more storage device resources are over- or under-utilized. In another example, dynamic mode may be implemented continually and step 706 may be omitted.

Referring to FIG. 7B, once the storage device is in dynamic submission queue selection mode, control proceeds to step 708 where the storage device uses submission queue command statistics and storage device resource state to select the submission queue from which the next command or commands should be fetched. This step may be performed by device controller 108 using the statistics collected by command monitor 400 and the storage device resource state information collected by storage device resource monitor 402. In step 710, the command is fetched from the selected submission queue. For example, submission queue selector 404 may provide a selection input to fetcher 406 which fetches the command from the identified submission queue. In step 712, the command is provided to command processing logic 410. For example, submission queue selector 404 may provide the command to command processing logic 410. Command processing logic 410 may process the command, which may be a memory read, a memory write, or an admin command, and perform the selected operation on the nonvolatile memory device 106. Command processing logic 410 or a separate process may write an entry to a completion queue indicating completion of command and an indication of whether the command was completed with or without error.

Device controller 108 may operate in dynamic submission queue selection mode as long as there is a constraint or limitation on available storage device resources. If the constraint or limitation is removed, device controller 108 may switch back into static submission queue selection mode. Thus, device controller 108 may control the switching of storage device 106 between static and dynamic submission queue selection modes depending on device resource state.

Intelligent memory device command fetching according to the subject matter described herein improves utilization of nonvolatile storage devices by selecting or fetching commands from submission queues when storage device resources are available to process the commands. Such intelligent fetching also improves host utilization of a nonvolatile storage device because the nonvolatile storage device may process commands from the host faster than in implementations where round robin or weighted round robin command fetching only is used. It should also be noted that any of the intelligent command fetching methods or systems described herein may be used in combination with round robin, weighted round robin selection, or other host-defined command fetching algorithm without departing from the scope of the subject matter described herein.

The subject matter described herein can be implemented in any suitable NAND flash memory, including 2D or 3D NAND flash memory. Semiconductor memory devices include volatile memory devices, such as dynamic random access memory ("DRAM") or static random access memory ("SRAM") devices, nonvolatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that the subject matter described herein is not limited to the two dimensional and three dimensional exemplary structures described but cover all relevant memory structures within the spirit and scope of the subject matter as described herein and as understood by one of skill in the art.

It will be understood that various details of the presently disclosed subject matter may be changed without departing from the scope of the presently disclosed subject matter.

Furthermore, the foregoing description is for the purpose of illustration only, and not for the purpose of limitation.

What is claimed is:

1. A method, comprising:
collecting submission queue command statistics including command type information for each of a plurality of submission queues associated with a data storage device including a controller and a memory, the command type information including information regarding whether particular submission queues historically contain a majority of random input/output (I/O) commands or a majority of sequential I/O commands;
monitoring resource state of the data storage device;
using the submission queue command statistics and the resource state to select a submission queue from which a next data storage device command should be fetched;
fetching the command from the selected submission queue; and
providing the command to command processing logic.

2. The method of claim 1 wherein collecting submission queue command statistics includes collecting statistics regarding a number of pending commands in each of a plurality of submission queues.

3. The method of claim 1 wherein collecting submission queue command statistics includes collecting an indication of a number of commands fetched from each of a plurality of submission queues.

4. The method of claim 3 wherein collecting command type information includes collecting information regarding whether particular submission queues historically contain a majority of read or a majority of write commands.

5. The method of claim 1 wherein monitoring resource state includes monitoring read pipeline state of the data storage device.

6. The method of claim 1 wherein monitoring resource state includes monitoring write pipeline state of the data storage device.

7. The method of claim 1 wherein using the submission queue command statistics and the resource state to select the submission queue includes, in response to determining that a read pipeline of the data storage device is currently unavailable to process a read command and that a particular submission queue has historically contained a majority of read commands, bypassing selection of the particular submission queue in favor of a submission queue that has historically contained a majority of write commands.

8. The method of claim 1 wherein using the submission queue command statistics and the resource state to select the submission queue includes, in response to determining that a write pipeline of the data storage device is currently unavailable to process a write command and that a particular submission queue has historically contained a majority of write commands, bypassing selection of the particular submission queue in favor of a submission queue that has historically contained a majority of read commands.

9. The method of claim 1 wherein collecting the submission queue command statistics and monitoring the resource state includes continually collecting the submission queue command statistics and continually monitoring the resource state.

10. The method of claim 1 wherein the data storage device comprises a nonvolatile memory device and the controller comprises a nonvolatile memory controller.

11. The method of claim 10 wherein the nonvolatile memory controller comprises a nonvolatile memory express (NVMe) controller.

12. The method of claim 1 wherein the memory comprises two dimensional or three dimensional NAND flash memory.

13. A data storage device comprising:
a memory;
a command monitor for collecting submission queue command statistics including command type information for each of a plurality of submission queues, the command type information including information regarding whether particular submission queues have historically contained a majority of random input/output (I/O) commands or a majority of sequential I/O commands;
a resource monitor for monitoring a resource state of the data storage device;
a submission queue selector for using the submission queue command statistics and the resource state to select a submission queue from which a next data storage device command should be fetched; and
a command fetcher for fetching the command from the selected submission queue and providing the command to the submission queue selector, which provides the command to command processing logic.

14. The data storage device of claim 13 wherein the command monitor is configured to collect statistics regarding a number of pending commands in each of a plurality of submission queues.

15. The data storage device of claim 13 wherein the command monitor is configured to collect an indication of a number of commands fetched from each of a plurality of submission queues.

16. The data storage device of claim 13 wherein the command monitor is configured to collect information regarding whether particular submission queues have historically contained a majority of read commands or a majority of write commands.

17. The data storage device of claim 13 wherein the resource monitor is configured to monitor read pipeline state of the data storage device.

18. The data storage device of claim 13 wherein the resource monitor is configured to monitor write pipeline state of the data storage device.

19. The data storage device of claim 13 wherein the submission queue selector is configured to, in response to a determination that a read pipeline of the data storage device is currently unavailable to process a read command and that a particular submission queue has historically contained a majority of read commands, bypass selection of the particular submission queue in favor of a submission queue that has historically contained a majority of write commands.

20. The data storage device of claim 13 wherein the submission queue selector is configured to, in response to a determination that a write pipeline of the data storage device is currently unavailable to process a write command and that a particular submission queue has historically contained a majority of write commands, bypass selection of the particular submission queue in favor of a submission queue that has historically contained a majority of read commands.

21. The data storage device of claim 13 wherein the command monitor is configured to continually collect the submission queue command statistics and wherein the resource monitor is configured to continually monitor the resource state of the data storage device.

22. The data storage device of claim 13 comprising a controller, wherein the command monitor, the resource monitor, the submission queue selector, and the command fetcher are components of the controller.

23. The data storage device of claim 13 wherein the memory comprises a nonvolatile memory and further comprising a memory controller.

24. The data storage device of claim 23 wherein the memory controller comprises a nonvolatile memory controller.

25. The data storage device of claim 24 wherein the nonvolatile memory controller comprises a nonvolatile memory express (NVMe) controller.

26. The data storage device of claim 13 wherein the memory comprises two dimensional or three dimensional NAND flash memory.

27. A non-transitory computer readable medium having stored thereon executable instructions that when executed by the processor of a computer control the computer to perform steps comprising:
- collecting submission queue command statistics including command type information for each of a plurality of submission queues, the command type information including information regarding whether particular submission queues historically contain a majority of random input/output (I/O) commands or a majority of sequential I/O commands;
- monitoring resource state of a data storage device including a memory and a controller;
- using the submission queue command statistics and the resource state to select a submission queue from which a next data storage device command should be fetched;
- fetching the command from the selected submission queue; and
- providing the command to command processing logic.

28. A method, comprising:
- collecting submission queue command statistics associated with a data storage device including a controller and a memory;
- monitoring resource state of the data storage device;
- using the submission queue command statistics and the resource state to select a submission queue from which a next data storage device command should be fetched;
- fetching the command from the selected submission queue;
- providing the command to command processing logic; and
- initially operating in a static submission queue selection mode and switching to using the submission queue command statistics and the resource state to select the submission queue from which the next data storage device command should be fetched in response to a predetermined trigger.

29. A data storage device comprising:
- a memory;
- a command monitor for collecting submission queue command statistics;
- a resource monitor for monitoring a resource state of the data storage device;
- a submission queue selector for using the submission queue command statistics and the resource state to select a submission queue from which a next data storage device command should be fetched; and
- a command fetcher for fetching the command from the selected submission queue and providing the command to the submission queue selector, which provides the command to command processing logic, wherein the submission queue selector is configured to initially operate in a static submission queue selection mode and switch to using the submission queue command statistics and the resource state to select the submission queue from which the next data storage device command should be fetched in response to a predetermined trigger.

* * * * *